July 29, 1941.  M. P. WHITNEY  2,250,881
ENGINE STARTER
Filed Feb. 26, 1938 elastic material

Witness:
Burr W. Jones

INVENTOR.
Maurice P. Whitney
BY Clinton S. Jones
ATTORNEY.

Patented July 29, 1941

2,250,881

UNITED STATES PATENT OFFICE 2,250,881

ENGINE STARTER

Maurice P. Whitney, Elmira, N. Y., assignor, by mesne assignments, to Bendix Aviation Corporation, South Bend, Ind., a corporation of Delaware Application February 26, 1938, Serial No. 192,825

3 Claims. (Cl. 64—30)

The present invention relates to engine starters and more particularly to means for yieldably connecting a starting motor to a member of an engine to be started.

It is an object of the present invention to provide an engine starter drive incorporating a novel form of cushioning and silencing means for the engine-driven member.

It is another object to provide such a device in which a novel form of frictional coupling device is used for connecting the engine-driven member to its mount.

A further object is to provide such a device in which the coupling means is readily adjustable to vary its torque capacity.

It is another object to provide such a device in which the coupling units are of simple and inexpensive construction, easy to install and replace.

Figure 1:
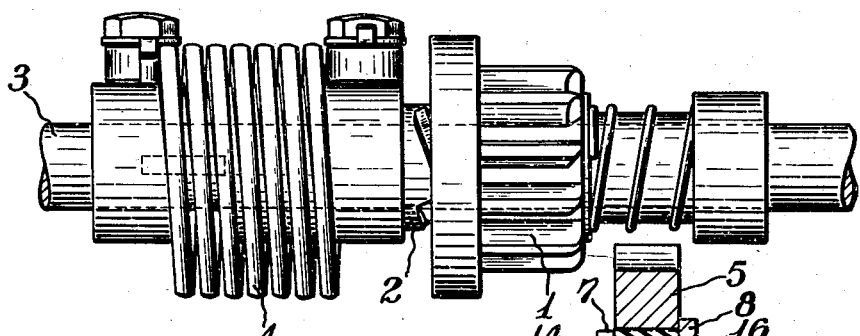
Figure 2:
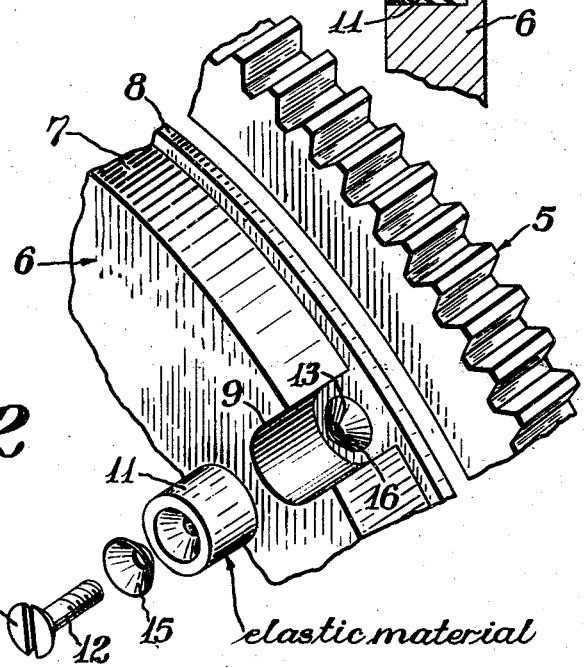

Further objects and advantages will be apparent from the following description taken in connection with the accompanying drawing in which:

Fig. 1 is a side elevation partly in section of starter gearing embodying a preferred form of the present invention; and Fig. 2 is a detail in perspective of certain of the parts of applicant's novel drive, shown in disassembled relation.

In Fig. 1 of the drawing, there is illustrated a commercial form of starter drive embodying a pinion 1 threaded on a screw shaft 2 and adapted to be driven from a power shaft 3 by means including a coiled spring 4. The pinion 1 is arranged to engage and drive a ring gear 5 mounted on an engine-driven member 6 such as a flywheel.

According to the present invention, the ring gear 5 is loosely mounted on a bearing seat 7 formed on the periphery of the flywheel 6 and defined by a lateral flange 8, and means are provided for yieldably and frictionally connecting the ring gear to the flywheel. As here shown, recesses 9 are formed in the periphery of the flywheel at suitably spaced intervals, and cylindrical blocks 11 of elastically deformable material such as rubber having a high coefficient of friction, are placed in said recesses in engagement with the inner periphery of the ring gear 5. Adjustable means for compressing the rings 11 laterally of the flywheel so as to expand them radially into frictional engagement with the ring gear, are provided in the form of bolts 12 traversing the rubber blocks 11 and threaded as shown at 13 in the flywheel 6. The bolts 12 are provided with conical heads 14 adapted to expand the interior of the blocks 11.

Conical washers 15 are preferably interposed between the heads 14 of bolts 12 and the interior of the rubber blocks 11, and conical protuberances 16 may be formed on the surface of the flywheel where the bolts 12 are threaded therein, or may be formed as separate expanding elements to assist the clamping action of the rubber blocks 11.

In assembling this structure, the ring gear 5 is first placed on the flywheel 6, the blocks 11 are then inserted and the bolts 12 tightened up until an adequate frictional drive is established between the ring gear and flywheel. When the drive is operated, the pinion 1 is caused to automatically engage the ring gear 5 by reason of its threaded connection, and the shock of such engagement is absorbed by the yielding and slippage of the coupling formed by the rubber blocks 11.

It will be appreciated that there is here provided a very simple and economical arrangement which is easy to install and adjust and readily adaptable for installation in varying conditions of service.

Although but one form of the invention has been shown and described in detail, it will be understood that other embodiments are possible and that various changes may be made in the design and arrangements of the parts without departing from the spirit of the invention as defined in the claims appended hereto.

What is claimed is:

1. In an engine starter drive, a ring gear, an engine member having a peripheral seat on which the ring gear is rotatably mounted, and having a plurality of recesses in said seat, blocks of elastic material having a high coefficient of friction heated in said recesses and engaging the interior of the ring gear, and means for compressing said blocks laterally of the engine member within the recesses to cause them to expand radially of the engine member and thereby increase the frictional engagement thereof with the interior of the ring gear.

2. In an engine starter, a ring gear, an engine flywheel having a peripheral bearing on which said ring gear is rotatably mounted, said flywheel having recesses spaced about its periphery, elastic frictional elements seated in said recesses and bearing on the interior of the ring gear, and means traversing the frictional elements for compressing said elements laterally of the flywheel to expand them radially against the interior of the ring gear.

3. In an engine starter, a ring gear, an engine flywheel having a peripheral bearing on which said ring gear is rotatably mounted, said flywheel having recesses spaced about its periphery, elastic cylindrical elements seated in said recesses and bearing frictionally on the interior of the ring gear, and adjustable members traversing said cylindrical elements laterally of the flywheel and having expanding means operable to force the cylindrical elements against the interior of the ring gear.

MAURICE P. WHITNEY.